Figure 1:
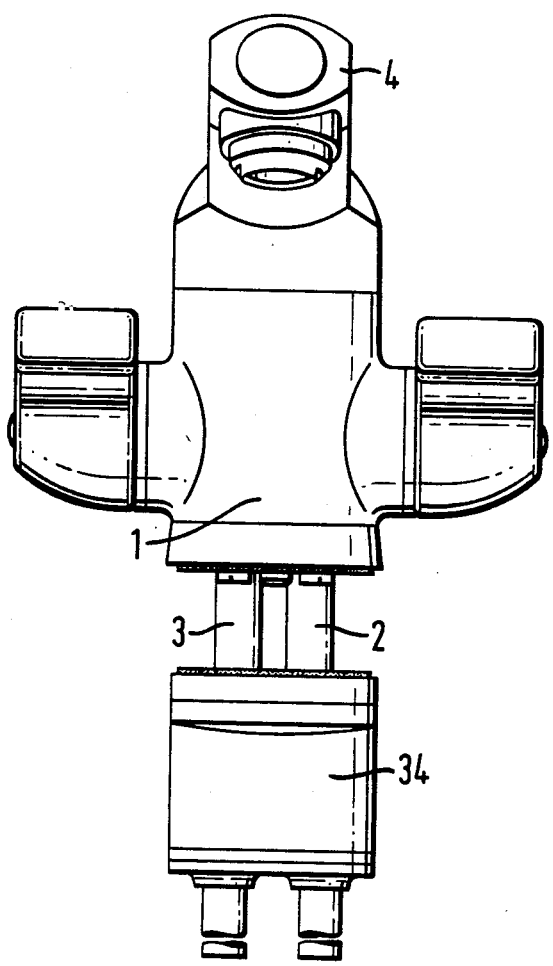

United States Patent [19]

Hammarstedt

[11] Patent Number: 4,573,493

[45] Date of Patent: Mar. 4, 1986

[54] SEQUENTIALLY CONTROLLED WATER MIXER

[75] Inventor: Gösta Hammarstedt, Alstermo, Sweden

[73] Assignee: Arcu Armaturindustri AB, Alstermo, Sweden

[21] Appl. No.: 589,016

[22] Filed: Mar. 13, 1984

[30] Foreign Application Priority Data

Mar. 17, 1983[CH] Switzerland .................. 1470/83

[51] Int. Cl.⁴ .................. F16K 43/00; F16K 37/00; F16K 19/00
[52] U.S. Cl. .................. 137/315; 137/246; 137/606; 137/625.41; 137/553; 137/801; 251/230; 251/288
[58] Field of Search .................. 137/315, 454.2, 454.6, 137/316, 246.11, 603, 605, 606, 607, 625.41, 801, 246.12, 897, 246, 553, 556; 251/230, 288

[56] References Cited

U.S. PATENT DOCUMENTS

| | | | |
|---|---|---|---|
| 1,828,175 | 10/1931 | Crosby | 137/605 |
| 1,901,479 | 3/1933 | Travis | 137/606 |
| 1,981,496 | 11/1934 | Buttner | 137/606 |
| 3,135,285 | 6/1964 | Volpin | 137/246.12 |
| 3,174,717 | 3/1965 | Bray | 251/230 |
| 3,292,652 | 12/1966 | Gallone | 137/246 |
| 3,371,685 | 3/1968 | Tilney, Sr. | 251/120 |
| 3,443,595 | 5/1969 | Baldwin | 137/607 |
| 3,915,195 | 10/1975 | Manoogian et al. | 137/625.41 |
| 4,074,697 | 2/1978 | Saether | 137/801 |

Primary Examiner—George L. Walton
Attorney, Agent, or Firm—Browdy and Neimark

[57] ABSTRACT

The invention relates to a sequentially controlled water mixer comprising a valve housing (1) with a cold water inlet connection (2) and a hot water inlet connection (3), and a common outlet (4), said casing defining a mixing chamber (5) between the inlets and outlet with a regulating chamber (6) located on the inlet side for housing an adjustable regulating switching valve (7) of substantially rotationally-symmetrical shape and with regulating apertures (8,9), said valve being adjustable to seal-off the inlet connections (2,3), or to control flow through the connections via said apertures (8,9). According to the invention the said inlet connections define recessed holes of larger dimension than respective hot and cold water pipes to be used therewith, and each hole accommodates a compression spring (27) and a seal (28) loaded by the spring to rest in contact with said switching valve (7) via a sealing surface which follows the contour of said switching valve. This sealing surface has a through hole (31) for the flow of water, and is provided peripherally with holes or the like (33) for retaining a lubricant inserted therein. Furthermore, the mixer has at least one operating knob (13) which can be rotationally set relative to the switching valve (7), and a connecting device (34) into or out of which the connections (2,3) in the form of short lengths of pipe, can be inserted, or withdrawn, seals being provided for sealing the inlet connections with the connecting device.

7 Claims, 9 Drawing Figures

SEQUENTIALLY CONTROLLED WATER MIXER

The present invention relates to a sequentially controlled water mixer of the kind comprising a valve housing with a cold water inlet connection, a hot water inlet connection, and a common outlet, said housing defining a mixing chamber between the inlets and outlet and a regulating chamber located on the inlet side of the mixing chamber, and a rotationally adjustable regulating switching valve housed in the regulating chamber and having regulating apertures, said valve being adjustable to seal-off the inlet connections, or to control flow through the connections via said apertures.

A sequentially controlled water mixer for wash basins, showers, rinsing appliances and baths is known in which cold, hot or mixed water is made available by means of a single regulating device which can be moved from a closed position, for example, first into a slightly opened position to allow only cold water to flow, and next to increase this flow and then to begin to mix in hot water gradually, increasing the hot water portion so as then to supply hot water in greater quantities, finally moving into a fully open position exclusively for hot water.

A disadvantage of this previously known water mixer is the fact that sequential control is not in itself capable of regulating the flow of mixed water, which means that, for example, with a stronger flow of cold or hot water the mixed flow becomes greater than is desired. On the other hand, if the mixed flow is made exactly the right amount, it is not possible to obtain a suitably strong adjusted flow of only cold or only hot water, which becomes instead far too restricted. Another disadvantage of the previously known mixer lies in the fact that it is not capable of compensating for the considerable differences in pressure in the mains water supply which frequently arise. This means that far too much water is obtained at one point, and with a mixer of exactly the same kind, far too little water is obtained at another point. A further consequence is that the temperature of the mixed water may therefore fluctuate very significantly. The said mixers are also beset with other shortcomings which will not be described in detail here.

It is an object of the invention to remedy these shortcomings and to eliminate them as far as possible, and to provide an improved sequentially controlled water mixer which, broadly speaking, may be used universally, irrespective of even very strongly differing mains pressure. A further object of the invention is to develop the technology of this field further in various directions, particularly in relation to energy saving, increasing operational reliability, reducing production, assembly and installation costs, and to design the mixer so that it is easy to maintain, i.e. it is simple to maintain insofar as maintenance is necessary at all. Moreover, indication of the different settings would be advantageous.

According to this invention, a sequentially controlled water mixer of the kind described in the introduction, is characterised in that the inlet connections define recessed holes which are of larger dimension than respective cold and hot inlet pipes to be used therewith, in that a compression spring and a seal are accomodated in each hole, the seal being loaded by the spring into contact with said switching valve via a sealing surface which follows the contour of said switching valve, said sealing surface defining a through hole for water inlet and peripheral holes or the like for retaining a lubricant inserted therein, and in that the mixer has at least one operating member which can be set relative to the switching valve, and a connecting device into or out of which the inlet connections, in the form of short lengths of pipe, can be inserted or withdrawn, seals being provided for sealing the inlet connections with the connecting device.

Further features and advantages of the invention will become apparent from the following description, with reference to the accompanying drawings.

Figure 2:
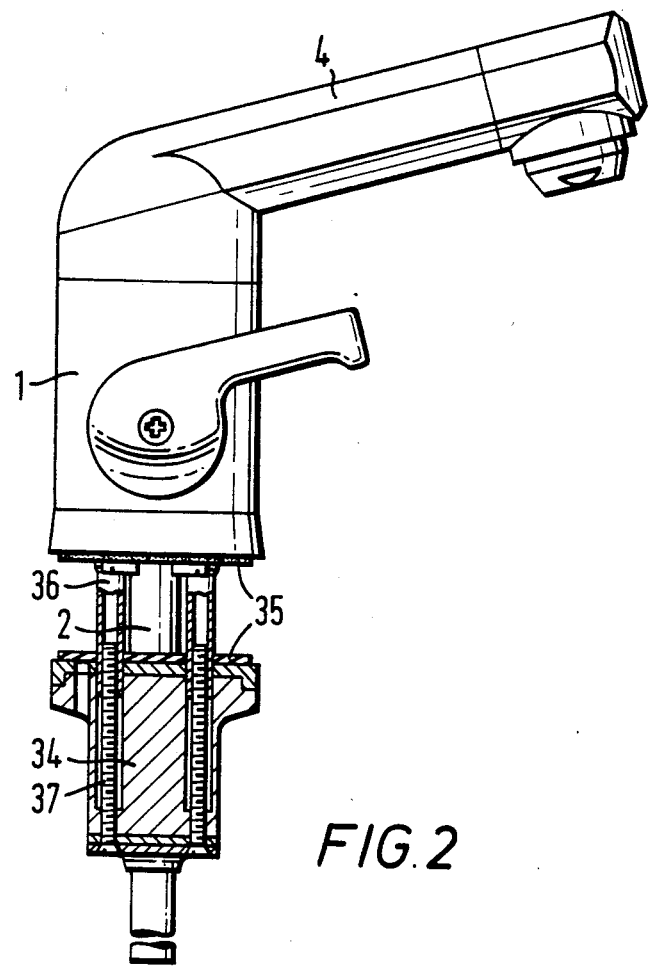
Figure 3:
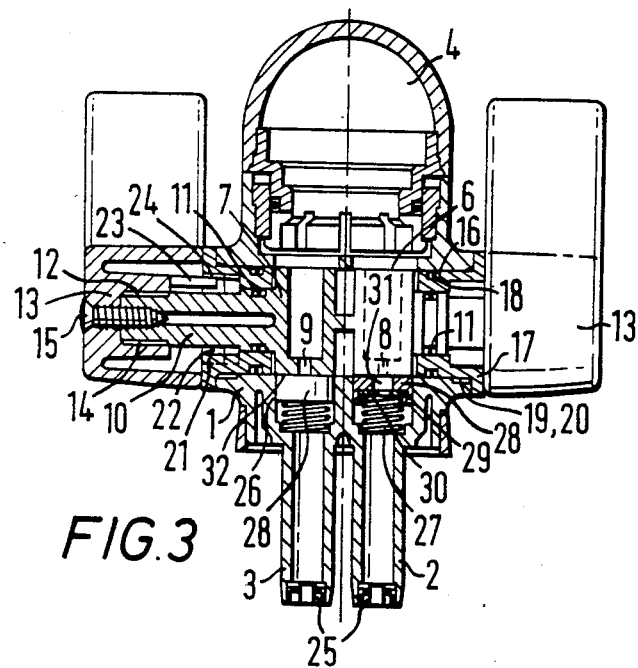
Figure 4:
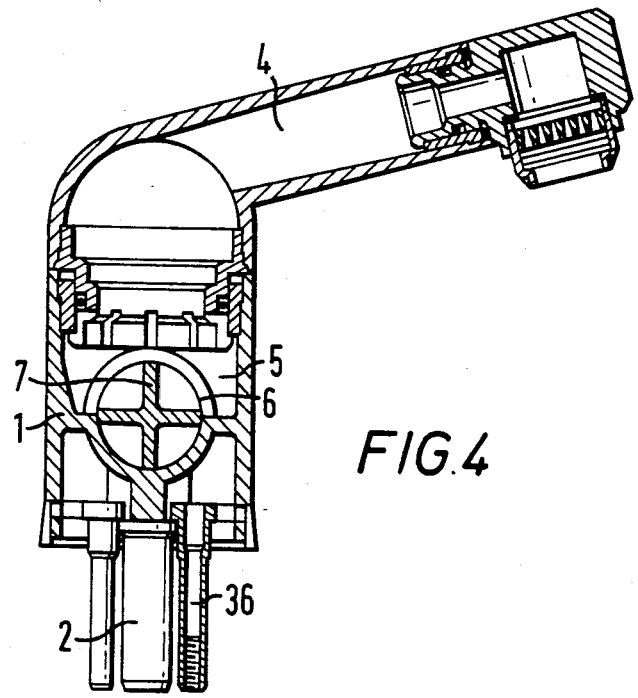
Figure 5:
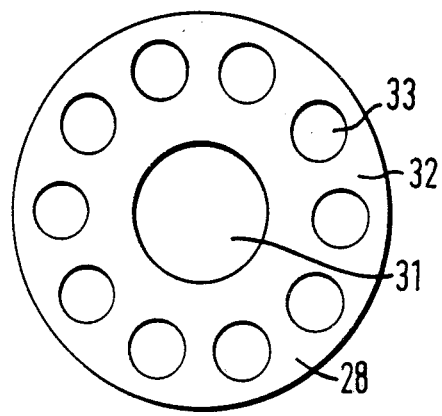
Figure 6:
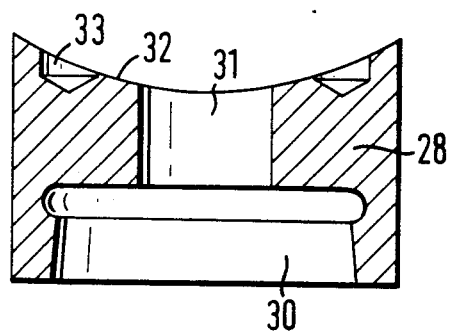
Figure 9:
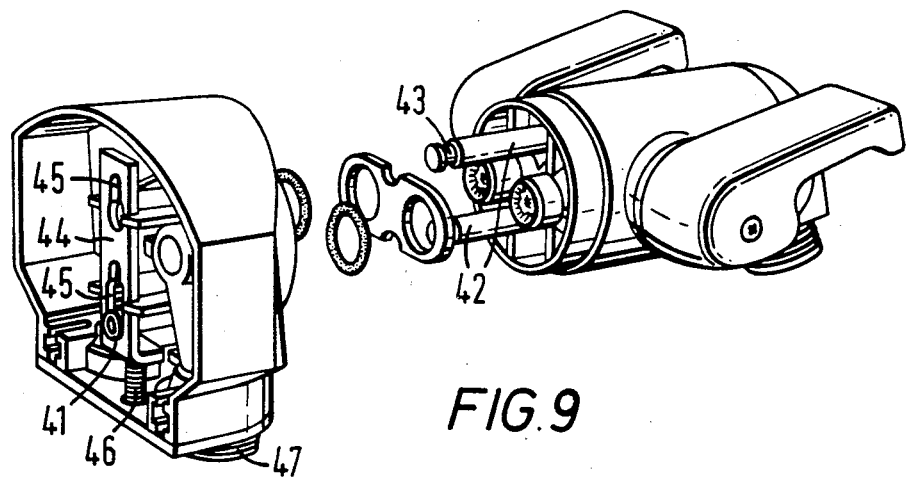
Figure 7:
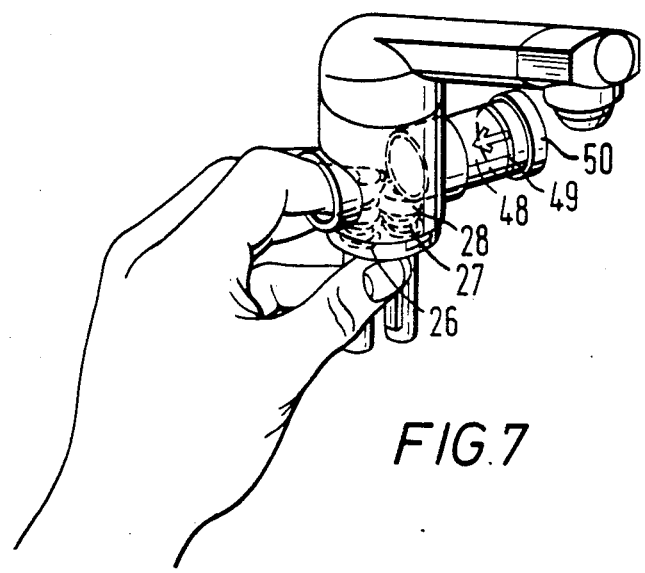
Figure 8:
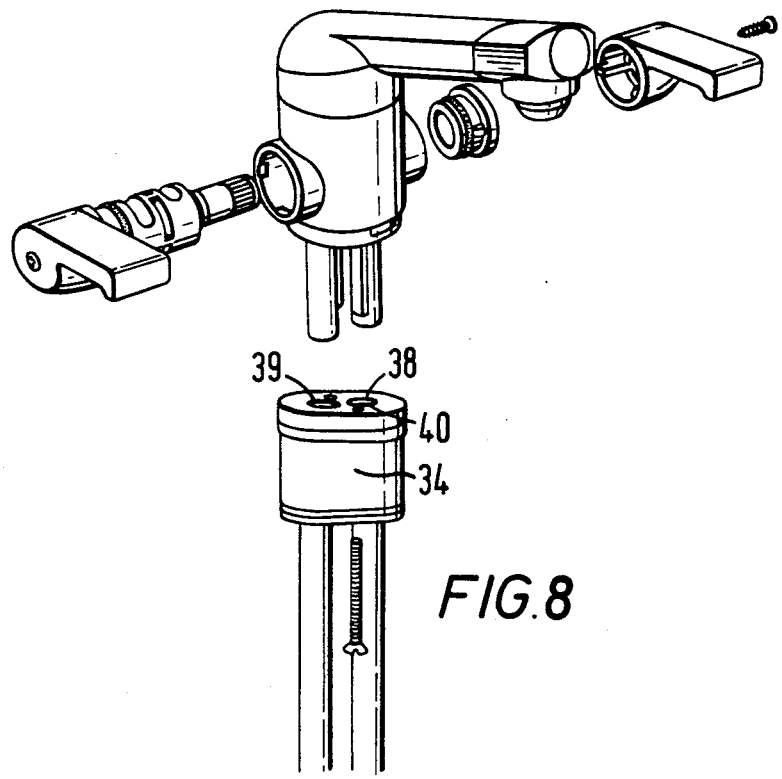

FIG. 1 shows in elevation a preferred embodiment of a sequentially controlled water mixer according to the invention, with a connecting device, FIG. 2 shows the same mixer, looking from the left to FIG. 1, with the connecting device sectioned, FIG. 3 shows the mixer from FIG. 1, partially sectioned, FIG. 4 shows the mixer as in FIG. 2, partially sectioned, FIG. 5 is a plan view onto a seal appertaining to the mixer shown in the above Figures, FIG. 6 is a diametral section through the seal shown in FIG. 5, FIG. 7 shows an assembly stage of a water mixer according to the invention, FIG. 8 shows another assembly stage of a water mixer according to the invention, and FIG. 9 shows a further assembly stage of a somewhat modified version of the water mixer according to the invention, for mounting on a wall.

In the Figures on the drawing, 1 designates a valve housing which is seated in a known way on a cold water inlet connection 2 and a hot water inlet connection 3, while a common outlet for these is designated 4. A mixing chamber 5 is located between them, directly in front of the outlet, together with a regulating chamber 6 which is preferably rotationally symmetrical, e.g. cylindrical, and which houses a regulating switching valve 7 of known design with regulating apertures 8 and 9, which are somewhat displaced relative to each other in order to allow the desired flow of water in each position. The main part of the switching valve is thus a body which is basically cylindrical, for example, and which seals off the outlets into the regulating chamber 6 of the inlet connections 2 and 3 except for the said apertures. In the axial direction or transversely to the said outlets axial pins 10 project concentrically from the end faces of the said body, preferably on both sides thereof, with O-rings 11 around their grooved necks and with teeth 12 provided round their free ends for holding knobs 13 rotationally-fixed in desired positions. The knobs are therefore provided with internal teeth 14 adapted to the teeth 12, and are preferably secured by means of a central screw 15 which extends into the free end of the pin 10. A valve housing aperture 16 which receives the pins 10 houses a sleeve-like gland 17 with an external O-ring 18 and external position indicators 19 which are adapted to corresponding internal position indicators 20 in the aperture 16 and co-act therewith. On its internal surface the gland has two stops 21, one for an open position and one for a closed position, which co-act with a stop projection 22 on the inner surface of the knob; from this inner surface a projection 23 made in the same way also projects, co-acting with an indicator tab 24 which projects from the inner surface of the gland between the two stops. The purpose of the projection 23 and tab 24 is to produce a resistance which can be detected as a click, and to make it so that it can be overridden, e.g. at the transition between the mixing and/or hot water pins. There may thus be a plurality of indicator tabs. These detectable indications can be very valuable for people with a sight impediment or whenever it is desired to open a mixer quickly and without using the eyes, and at the same time to obtain the desired temperature and/or flow setting. These indicators are also particularly valuable for children.

According to the invention, an automatic flow regulator 25 is inserted in preferably both of the water connections 2 and 3, allowing a flow up to a certain level of pressure without any significant throttling effect, e.g. up to 1 bar. Even when this level is greatly exceeded, e.g. up to 10 bar, the flow still remains approximately constant at 6 liter/min, for example. This means that, particularly when both connections are provided with a regulator of this kind, the amounts of water supplied for throughput, for example at different temperatures, and their internal ratio do not vary to any significant extent, so that substantially constant levels of flow and temperatures can be maintained and guaranteed, irrespective of different pressures and pressure variations, or pressure ratios between the two connections.

The outlets of the connections 2 and 3 into the regulating chamber 6 are formed as apertures 26 widened out to form a shoulder, with a helical compression spring 27 accommodated at the bottom of the recess, resting via one of its ends on the said shoulder and braced via the other end against a seal 28 via a shim 29, for example; the shim and the relevant end of the spring engage in a recess aperture 30 in the seal, which also has a central hole 31 through it.

The side 32 of the seal which faces towards the switching valve 7 is recessed in a partial-cylindrical shape and thus follows the contour of the switching valve. Lubrication holes 33 are provided in this side round the opening 31, preferably disposed close together and evenly distributed, and are designed to be filled with a heat- and water-resistant grease. As this sealing face is pressed constantly against the switching valve by the spring and water pressure, the very best sealing characteristics are ensured, and these do not deteriorate even after the mixer has been in use for a long time, and the lubrication holes are constantly sealed off so that it is impossible for more grease than is necessary to keep the switching valve well lubricated ever to leave the lubrication holes. Moreover, the total surface area of the lubricating holes reduces the area of direct contact of the seal on the valve considerably, so that lower friction resistance is obtained although the lubrication holes and the grease stored in them contribute to effective sealing. The lubrication holes may of course be replaced by a lubrication channel or the like, but flat holes are more advantageous and provide greater stability and holding strength.

The mixer according to the invention is preferably mounted on a connecting device 34 which is provided for the purpose of such attachment, for example beneath a wash basin, rinsing appliance or the like; for this, the mixer and the device are both provided with a seal 35, and tapped sleeves 36 projecting from the mixer are also provided to receive screws 37 anchored in the device 34. The mixer connections 2 and 3 are preferably in the form of short pipes which can preferably be produced in one piece with the mixer housing and which are designed to be introduced into the device 34 in the holes 38, 39 with internal O-rings 40. The mixer is thus simply plugged into the device or pulled out of it extremely fast, apart from the fact that the screw connections have to be tightened or loosened; these are all mounting and dismantling steps which can be carried out easily even by a non-expert.

FIG. 9 shows an alternative embodiment of a mixer according to the invention, with alternative fixing of the mixer on a connecting device which in this case can be attached to a wall by means of a single screw which is designed to be introduced into and through the device from the side of the mixer, for example through a sleeve socket 41. Beside the said pipes, instead of the screws 37 described and shown previously the mixer also has locking pins 42 anchored in the mixer, with grooves 43 extending round their free end. The mixer is pushed into the connecting device via the pipes and the pins until the free ends of the pins project on the rear side, which happens automatically as soon as the mixer is pushed right on. In this position the grooves 43 lie in the same plane as a preferably L-shaped locking plate 44, the longer leg of which has two keyhole slots 45 provided in it in order first to receive therein the wider part of the locking pins, while the shorter leg nearest the mixer has a tapped bore (not shown) for receiving a screw 46 which is introduced into the connecting device from below. When this screw is tightened the locking plate moves downwards and guides the narrower, locking part of the keyhole slots round and into the grooves 43 on the pins, so that the pins and thus the mixer are secured against being pulled out. The mixer and the connecting device can engage in each other via overlapping edge parts and can also lie flush against each other so that a stable unit is obtained. The work process is reversed for dismantling. As can also be seen from the Figures on the drawing, the connecting devices are provided with connecting pipes or nipples 47 for connection to the mains supply. The long leg of the locking plate is guided in the mixer housing both in the lateral direction and in the transverse direction by holding elements which are cast, for example, in one piece with the mixer housing, so that the only movement which can be carried out is that occasioned by the screw 46.

Normally, the mixer according to the invention can be marketed fully assembled. In certain instances the mixer may be supplied in separate parts for the purpose of assembly, and in this case the following assembly method and apparatus are provided, which are also for maintenance such as replacement of the seals 28, for example.

In the mixer housing as shown in FIG. 7, still without the switching valve and knob, a compression spring 27 with a shim (not shown) and seal 28 are inserted in one of its outlets, these parts being pressed into the outlet with a finger, for example, from one side, while a positioning tool 48 is inserted from the other side, having the shape of a hollow cylindrical body with an external diameter corresponding to that of the switching valve. While the said parts are still being held in place in the outlet, the leading end of the tool is slid between the tip of the finger and the seal until the tool has slid right over the seal and holds the latter in place without other means, after which the other seal and the other parts are also fitted in a similar way, until virtually the whole tool is positioned in the mixer housing in the place of the switching valve, and holds the seals and the other parts in place. The mixer can also be supplied in this form. After this, the switching valve, which may already bear a knob on one end, for example, is inserted in the same direction from which the finger was previously inserted. The switching valve then pushes the tool out of the chamber 6 again ahead of it, but itself holds the seals in place, and finally the other knob can be mounted on the pin 10 projecting at the other side of the mixer housing, that is, if there are to be two such knobs.

The end of the tool opposite the leading end is preferably made with a base 49 inserted some way from this end, so that a container for lubricating grease, for example, is formed. The container can be closed by means of a lid 50 which engages over the top and which can also serve as an abutment surface for the mixer housing when the tool is inserted in it. The other end of the tool can also be closed off by a corresponding or similar lid so that a second, larger container is obtained, for holding a set of seals, springs and shims, for example. If possible, this latter lid should be able to be inserted in the tool in order to have sufficient room for it with the tool in the regulating chamber. A considerable advantage of the said tool is that the insertion pin, which is much smaller in diameter but relatively long, can be inserted fully in a tool made in the form described and shown, so that direct co-operation between the switching valve and the tool is obtained despite the axial pins with a smaller diameter connected to the switching valve, for example on both sides thereof.

The embodiments described above and shown in the Figures on the drawing should be regarded only as nonlimiting examples which can be modified and added to as desired within the framework of the concept of the invention and the following claims. In particular, the different individual parts of the various embodiments may be interchanged with each other in any way possible.

I claim:

1. A sequentially controlled water mixer comprising a valve housing with a cold water inlet connection on one side of the mixer, a hot water inlet connection on another side of the mixer, and a common outlet, said housing defining a mixing chamber between the inlet connections and said outlet and a regulating chamber located on the inlet side of the mixing chamber, and a rotationally adjustable regulating switching valve housed in the regulating chamber and having regulating apertures, said valve being manually adjustable by at least one operating member which can be set relative to said switching valve to control flow through the connections via said apertures, the inlet connections defining recessed holes which are of larger dimension than respective cold and hot inlet pipes to be connected therewith, a compression spring and a seal in each hole, a sealing surface of the seal being pressed by the spring into contact with said switching valve, said sealing surface following the contour of said switching valve, said seal defining a through hole for said inlet connection and peripheral holes for retaining a lubricant inserted therein, and a connecting device into which the inlet connections, in the form of short lengths of pipe, can be inserted, sealing means being provided for sealing the inlet connections with the connecting device, the valve housing defining an aperture which accommodates a respective axial pin, and further comprising a gland provided with an external O-ring and external position indicators corresponding to internal position indicators in said aperture, stops are provided on the inner surface of the gland, one for an open position and one for a closed position, said stops comprising stop projections in the bore of said at least one operating member, and a means projecting from the bore for cooperating with an indicator tab projecting from the inner surface of said gland between the stops to indicate valve positions.

2. A water mixer according to claim 1, having an automatic flow regulator inserted in at least one of the inlet connections.

3. A water mixer according to claim 1 comprising screw sleeves projecting from the mixer and receiving screws anchored in the connecting device.

4. A sequentially controlled water mixer, comprising a valve housing with a cold water inlet connection on one side of the mixer, a hot water inlet connection on another side of the mixer and a common outlet, said housing defining a mixing chamber between the inlet connections and outlet and a regulating chamber located on the inlet side of the mixing chamber, and a rotationally adjustable regulating switching valve housed in the regulating chamber and having regulating apertures, said valve being manually adjustable by at least one operating member which can be set relative to said switching valve to control flow through the connections via said apertures, the inlet connections defining recessed holes which are of larger dimension than respective cold and hot inlet pipes to be connected therewith, a compression spring and a seal in each hole, a sealing surface of the seal being pressed by the spring into contact with said switching valve, said sealing surface following the contour of said switching valve, said seal defining a through hole for said inlet connection and peripheral holes for retaining a lubricant inserted therein, and a connecting device into which the inlet connections, in the form of short lengths of pipe, can be inserted, sealing means being provided for sealing the inlet connections with the connecting device, the connecting device having a front and a rear side and being fixed to a wall by means of a single screw which is for inserting in and passing through a sleeve socket in the connecting device, a plurality of locking pins, each locking pin having a free end anchored in said mixer, the free ends being insertable through the front side of the connecting device and having grooves disposed therein, an L-shaped locking plate, having a longer leg and a shorter leg, on the rear side of the connecting device, the longer leg of the said plate having keyhole slots in the same plane as, and registering and corresponding with, said grooves, means defining a bore being provided in the shorter leg for receiving a screw insertable into the connecting device from below said bore so as to move said plate into a locking position, the plate being guided positively by retaining elements in the connecting device.

5. A water mixer according to claim 4, wherein the valve housing and the connecting device engage in each other via overlapping edge parts and rest flush against each other.

6. A sequentially controlled water mixer of the kind comprising a valve housing with a cold water inlet connection on one side of the mixer, a hot water inlet connection on another side of the mixer, and a common outlet, said housing defining a mixing chamber between the inlet connections and outlet and a regulating chamber located on the inlet side of the mixing chamber, and a rotationally adjustable regulating switching valve housed in the regulating chamber and having regulating apertures, said valve being manually adjustable by at least one operating member which can be set relative to said switching valve to control flow through the connections via said regulating apertures, the inlet connections defining recessed holes which are of larger dimension than respective cold and hot inlet pipes to be connected therewith, a compression spring and a seal in each hole, a sealing surface of the seal being pressed by the spring into contact with said switching valve, said sealing surface following the contour of said switching valve, said seal defining a through hole for said inlet connection and peripheral holes for retaining a lubricant inserted therein, the mixer having a pair of opposed valve housing apertures for receiving said at least one operating member, and a connecting device into which the inlet connections, in the form of short lengths of pipe, can be inserted, sealing means being provided for sealing the inlet connections with the connecting device, further comprising a positioning tool, in the form of a hollow cylindrical body with an external diameter corresponding approximately to the external diameter of the switching valve, one end of said tool being insertable into the regulating chamber through one of said valve housing apertures before said switching valve is inserted into said regulating chamber, for fitting and retaining said seals and compression springs.

7. A water mixer according to claim 6, wherein the end of the tool opposite its insertion end is fitted with a base to form a first container, said container being closable by a first lid engaging over the end opposite said insertion end of the tool, said opposite end also comprising an abutment surface for the mixer housing for limiting the extent to which the tool can be inserted in said mixer housing, and wherein the insertion end of the tool can also be closed by a second lid to form a second container the external diameter of the second lid is not greater than that of the tool so that the lid can be inserted together with the tool into the regulating chamber, and at least one end of the tool is recessed for temporarily receiving an axial pin on the switching valve.

* * * * *